United States Patent
Peitzer

(10) Patent No.: US 11,950,114 B2
(45) Date of Patent: Apr. 2, 2024

(54) SELECTIVE NETWORK SWITCHING FOR DUAL CONNECTIVITY

(71) Applicant: AT&T Intellectual Property I, L.P., Atlanta, GA (US)

(72) Inventor: Haywood Peitzer, Randolph, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 259 days.

(21) Appl. No.: 17/490,705

(22) Filed: Sep. 30, 2021

(65) Prior Publication Data
US 2023/0112670 A1    Apr. 13, 2023

(51) Int. Cl.
*H04W 24/08* (2009.01)
*H04L 5/00* (2006.01)
*H04W 76/30* (2018.01)
*H04W 88/06* (2009.01)

(52) U.S. Cl.
CPC ........... *H04W 24/08* (2013.01); *H04L 5/0055* (2013.01); *H04W 76/30* (2018.02); *H04W 88/06* (2013.01)

(58) Field of Classification Search
CPC .... H04L 5/0055; H04W 24/08; H04W 76/30; H04W 88/06
See application file for complete search history.

(56) References Cited

U.S. PATENT DOCUMENTS

| | | | |
|---|---|---|---|
| 2016/0095004 A1* | 3/2016 | Tseng | H04W 76/16 370/329 |
| 2017/0289889 A1* | 10/2017 | Sahu | H04W 24/10 |
| 2019/0312815 A1* | 10/2019 | Altman | H04L 43/026 |
| 2020/0383155 A1* | 12/2020 | Pati | H04W 76/34 |

FOREIGN PATENT DOCUMENTS

CN    112788787 A   *   5/2021

* cited by examiner

*Primary Examiner* — Brian P Cox

(57) ABSTRACT

An example method includes monitoring a status of a long term evolution network connection and a status of a fifth generation network connection over which a user endpoint device is simultaneously receiving data using an evolved-universal terrestrial radio access new radio dual connectivity configuration, detecting, based on the monitoring, that a performance metric of one of: the long term evolution network or the fifth generation network falls below a pre-defined threshold metric, and terminating, in response to the detecting, the long term evolution network connection or the fifth generation network connection to terminate the evolved-universal terrestrial radio access new radio dual connectivity configuration.

20 Claims, 3 Drawing Sheets

SELECTIVE NETWORK SWITCHING FOR DUAL CONNECTIVITY

The present disclosure relates generally to mobile communications technology, and relates more particularly to devices, non-transitory computer-readable media, and methods for selectively switching between networks while utilizing Evolved-Universal Terrestrial Radio Access New Radio (E-UTRA NR) Dual Connectivity (ENDC).

BACKGROUND

Many mobile communications service providers are transitioning their service networks from Fourth Generation (4G) Long Term Evolution (LTE) networks to Fifth Generation (5G) networks. Deployment of the underlying 5G network infrastructure is a gradual process, and, as a result, ENDC has been implemented as a solution to facilitate the transition from LTE to 5G with minimal disruption to service. In the ENDC configuration, a 5G gNodeB operates as a secondary node for an LTE eNodeB, which acts as a primary node and is connected to the core network. Data traversing either the LTE or the 5G network is split, with a first portion of the data being delivered to a user endpoint device over the LTE network and a second portion of the data being delivered to the user endpoint device over the 5G network. Thus, by utilizing ENDC, the LTE network acts as an anchor band that is supplemented by 5G, and LTE and 5G data streams may flow simultaneously.

SUMMARY

In one example, a method performed by a processing system includes monitoring a status of a long term evolution network connection and a status of a fifth generation network connection over which a user endpoint device is simultaneously receiving data using an evolved-universal terrestrial radio access new radio dual connectivity configuration, detecting, based on the monitoring, that a performance metric of one of: the long term evolution network or the fifth generation network falls below a predefined threshold metric, and terminating, in response to the detecting, the long term evolution network connection or the fifth generation network connection to terminate the evolved-universal terrestrial radio access new radio dual connectivity configuration.

In another example, a non-transitory computer-readable medium may store instructions which, when executed by a processing system in a communications network, cause the processing system to perform operations. The operations may include monitoring a status of a long term evolution network connection and a status of a fifth generation network connection over which a user endpoint device is simultaneously receiving data using an evolved-universal terrestrial radio access new radio dual connectivity configuration, detecting, based on the monitoring, that a performance metric of one of: the long term evolution network or the fifth generation network falls below a predefined threshold metric, and terminating, in response to the detecting, the long term evolution network connection or the fifth generation network connection to terminate the evolved-universal terrestrial radio access new radio dual connectivity configuration.

In another example, a device may include a processing system including at least one processor and non-transitory computer-readable medium storing instructions which, when executed by the processing system when deployed in a communications network, cause the processing system to perform operations. The operations may include monitoring a status of a long term evolution network connection and a status of a fifth generation network connection over which a user endpoint device is simultaneously receiving data using an evolved-universal terrestrial radio access new radio dual connectivity configuration, detecting, based on the monitoring, that a performance metric of one of: the long term evolution network or the fifth generation network falls below a predefined threshold metric, and terminating, in response to the detecting, the long term evolution network connection or the fifth generation network connection to terminate the evolved-universal terrestrial radio access new radio dual connectivity configuration.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
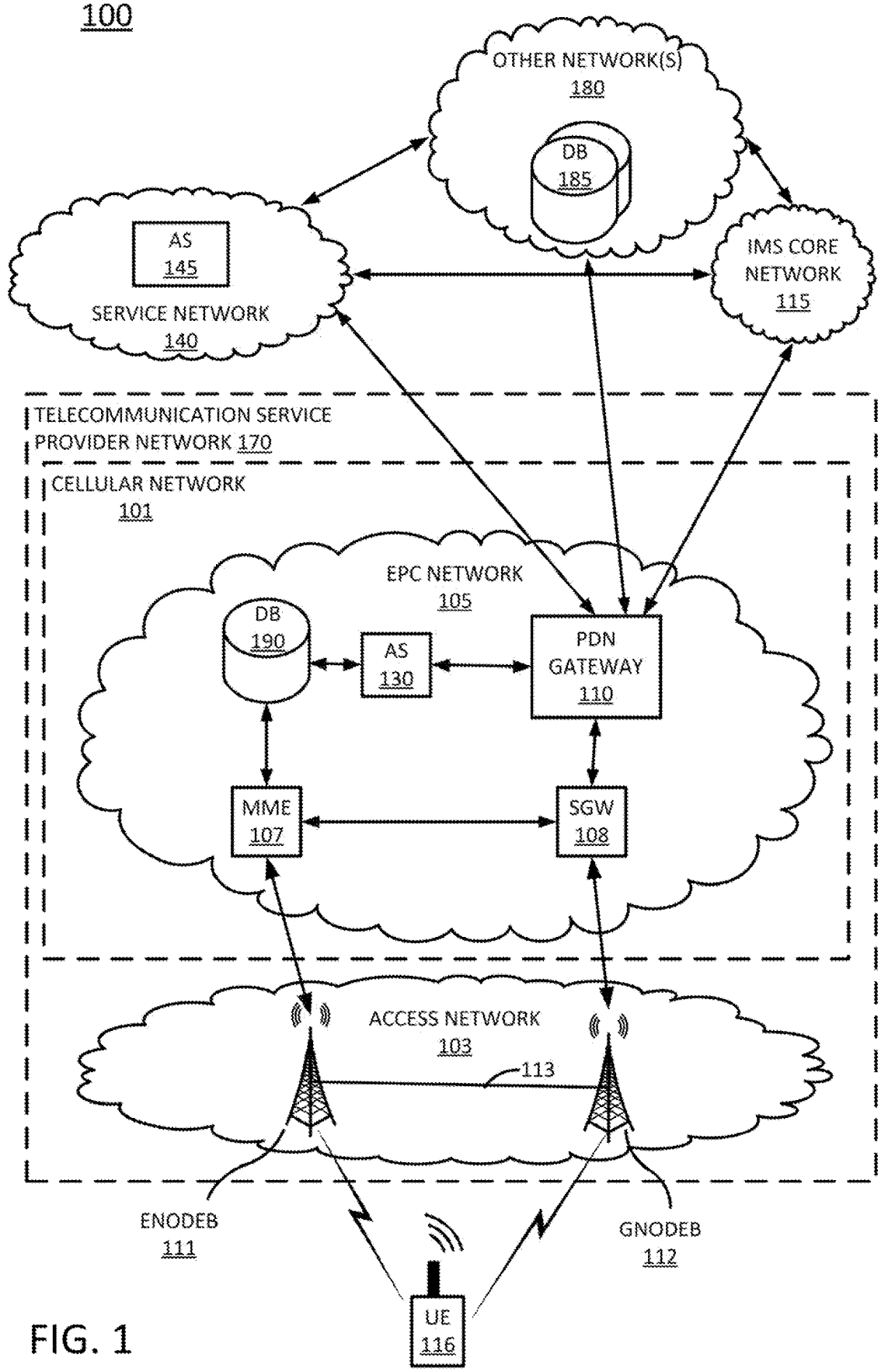
FIG. 1 illustrates an example network, or system, in which examples of the present disclosure for selectively switching between networks while utilizing ENDC may operate.

The present disclosure broadly discloses methods, computer-readable media, and systems for selectively switching between networks while utilizing Evolved-Universal Terrestrial Radio Access New Radio (E-UTRA NR) Dual Connectivity (ENDC). As discussed above, many mobile communications service providers are transitioning their service networks from Fourth Generation (4G) Long Term Evolution (LTE) networks to Fifth Generation (5G) networks. Deployment of the underlying 5G network infrastructure is a gradual process, and, as a result, ENDC has been implemented as a solution to facilitate the transition from LTE to 5G with minimal disruption to service. In the ENDC configuration, a 5G gNodeB operates as a secondary node for an LTE eNodeB, which acts as a primary node and is connected to the core network. Data traversing either the LTE or the 5G network is split, with a first portion of the data being delivered to a user endpoint device over the LTE network and a second portion of the data being delivered to the user endpoint device over the network. Thus, by utilizing ENDC, the LTE network acts as an anchor band that is supplemented by 5G, and LTE and 5G data streams may flow simultaneously.

When ENDC works well, it can effectively bridge the gap between LTE and networks with minimal disruption to service from the customer's perspective. However, effective ENDC relies on both the LTE and 5G networks exhibiting similar performance, which is not always the case. As discussed above, data that is destined for a user endpoint device may be split into portions that are separately delivered to the user endpoint device via the LTE and 5G networks. If the performance of one of those networks declines, then the portion of the data traversing that network may get dropped, may arrive late at the user endpoint device, may time out, or the like. If both portions of the data are not received by the user endpoint device in a timely manner, then the user endpoint device may not be able to properly reconstruct the original data. Thus, the service from the customer's perspective may actually be worse than if all of the data had simply been sent over one network.

Examples of the present disclosure detect, on the user endpoint device side, when the performance of one of the networks being utilized in an ENDC configuration falls below a threshold performance metric. When performance below the threshold performance metric is detected, the user endpoint device may disconnect from the low performing network and continue any data transmissions over a single network (i.e., the network whose performance is above the threshold performance metric). This allows the user endpoint device to benefit from the advantages of ENDC for as long as the ENDC is providing an acceptable level of performance; however, if and when the performance of the ENDC configuration no longer meets that acceptable level, the user endpoint device may selectively disconnect from the network that is the source of the poor performance. These and other aspects of the present disclosure are discussed in greater detail below in connection with the examples of FIGS. 1-3.

To better understand the present disclosure, FIG. 1 illustrates an example network, or system 100, in which examples of the present disclosure for selectively switching between networks while utilizing ENDC may operate. In one example, the system 100 includes a telecommunication service provider network 170. The telecommunication service provider network 170 may comprise a cellular network 101 (e.g., a 3$^{rd}$ Generation (3G) network, a 4$^{th}$ Generation (4G)/Long Term Evolution (LTE) network, a 4G/5$^{th}$ Generation (5G) hybrid network, a 5G network, a subsequent generation network, or the like), a service network 140, and a core network, e.g., an IP Multimedia Subsystem (IMS) core network 115. The system 100 may further include other networks 180 connected to the telecommunication service provider network 170.

FIG. 1 also illustrates at least one user endpoint device 116. In one embodiment, the user endpoint device may comprise any subscriber/customer endpoint device configured for wireless communication, such as a laptop computer, a Wi-Fi device, a Personal Digital Assistant (PDA), a mobile phone, a smartphone, an email device, a computing tablet, a messaging device, an Internet of Things (IoT) device, and the like. In one embodiment, the user endpoint device 116 may have both cellular and non-cellular access capabilities and may further have wired communication and networking capabilities. The user endpoint device 116 may be associated with a subscription service provided over the telecommunication service provider network 170, such as cellular phones services or other services.

In one example, the cellular network 101 may comprise an access network 103 and a core network, Evolved Packet Core (EPC) network 105. In one example, the access network 103 comprises a cloud RAN. For instance, a cloud RAN is part of the 3$^{rd}$ Generation Partnership Project (3GPP) 5G specifications for mobile networks. As part of the migration of cellular networks towards 5G, a cloud RAN may be coupled to an EPC network until new cellular core networks are deployed in accordance with 5G specifications. In one example, access network 103 may include cell sites or base stations including eNodeB 111 and gNodeG 112. eNodeB 111 may comprise an element of an LTE network, while gNodeG 112 may comprise a corresponding element of a 5G network.

In one example, the EPC network 105 provides various functions that support wireless services in the LTE environment. In one example, EPC network 105 is an Internet Protocol (IP) packet core network that supports both real-time and non-real-time service delivery across a LTE network, e.g., as specified by the 3GPP standards. In operation, user endpoint device 116 may access wireless services via the eNodeB 111 and/or gNodeG 112 located in the access network 103. It should be noted that any number of cell sites can be deployed in access network. In one illustrative example, the access network 103 may comprise two or more cell sites.

In EPC network 105, network devices such as Mobility Management Entity (MME) 107 and Serving Gateway (SGW) 108 support various functions as part of the cellular network 101. For example, MME 107 is the control node for the LTE access network. In one embodiment, MME 107 is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-cell handovers and as the anchor for mobility between LTE and other wireless technologies, such as 2G, 3G, and 5G wireless networks.

In one example, service network 140 may comprise one or more devices, such as application server (AS) 145 for providing services to subscribers, customers, and/or users. For example, telecommunication service provider network 170 may provide a cloud storage service, web server hosting, social media applications, and other services. As such, service network 140 may represent aspects of telecommunication service provider network 170 where infrastructure for supporting such services may be deployed. Although a single application server, AS 145, is illustrated in service network 140, it should be understood that service network 140 may include any number of components to support one or more services that may be provided to one or more subscribers, customers, or users by the telecommunication service provider network 170.

In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general. The other networks 180 may include databases (DBs) 185.

In one example, any one or more of the components of EPC network 105 may comprise network function virtualization infrastructure (NFVI), e.g., software defined networking (SDN) host devices (i.e., physical devices) configured to operate as various virtual network functions (VNFs), such as a virtual MME (vMME), a virtual serving gateway (vSGW), and so forth. For instance, MME 107 may comprise a vMME, SGW 108 may comprise a vSGW, and so forth. In this regard, the EPC network 105 may be expanded (or contracted) to include more or fewer components than the state of EPC network 105 that is illustrated in FIG. 1.

In accordance with the present disclosure, the gNodeB 112 may be connected to the eNodeB 111 through an X2 interface 113. Data en route to a user endpoint device served by the enodeB 111 follows the LTE protocol stack, while data en route to a user endpoint device served by the gNodeB 112 may traverse a new radio (NR) packet data convergence protocol (PDCP) entity at the eNodeB 111 and be transferred, via the X2 interface 113, to a peer NR radio link control (RLC) entity in the gNodeB 112. Thus, data belonging to the same connection (or even packet) can traverse either the eNodeB 111 or the gNodeB 112.

As further illustrated in FIG. 1, EPC network 105 may further include an application server (AS) 130, which may operate in a manner similar to the AS 145 to provide services to subscribers, customers, and/or users. For example, telecommunication service provider network 170 may provide a cloud storage service, web server hosting, social media applications, and other services. As such, service network 140 may represent aspects of telecommunication service provider network 170 where infrastructure for supporting such services may be deployed. Although a single application server, AS 145, is illustrated in service network 140, it should be understood that service network 140 may include any number of components to support one or more services that may be provided to one or more subscribers, customers, or users by the telecommunication service provider network 170.

The AS 130 may provide these functions in conjunction with a database (DB) 190. For instance, the DB 190 may store content such as video files (e.g., films, television programming, user-generated content, etc.), audio files (e.g., music, podcasts, audiobooks, etc.), images (e.g., still images), interactive content (e.g., video games, extended reality or immersive content, etc.) and other types of content which the AS 130 may provide to the user endpoint device 116 via download, streaming, or other means. The user endpoint device 116 may retrieve this content from the AS 130 via the access network 103.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN), EMSs, and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

Figure 3:
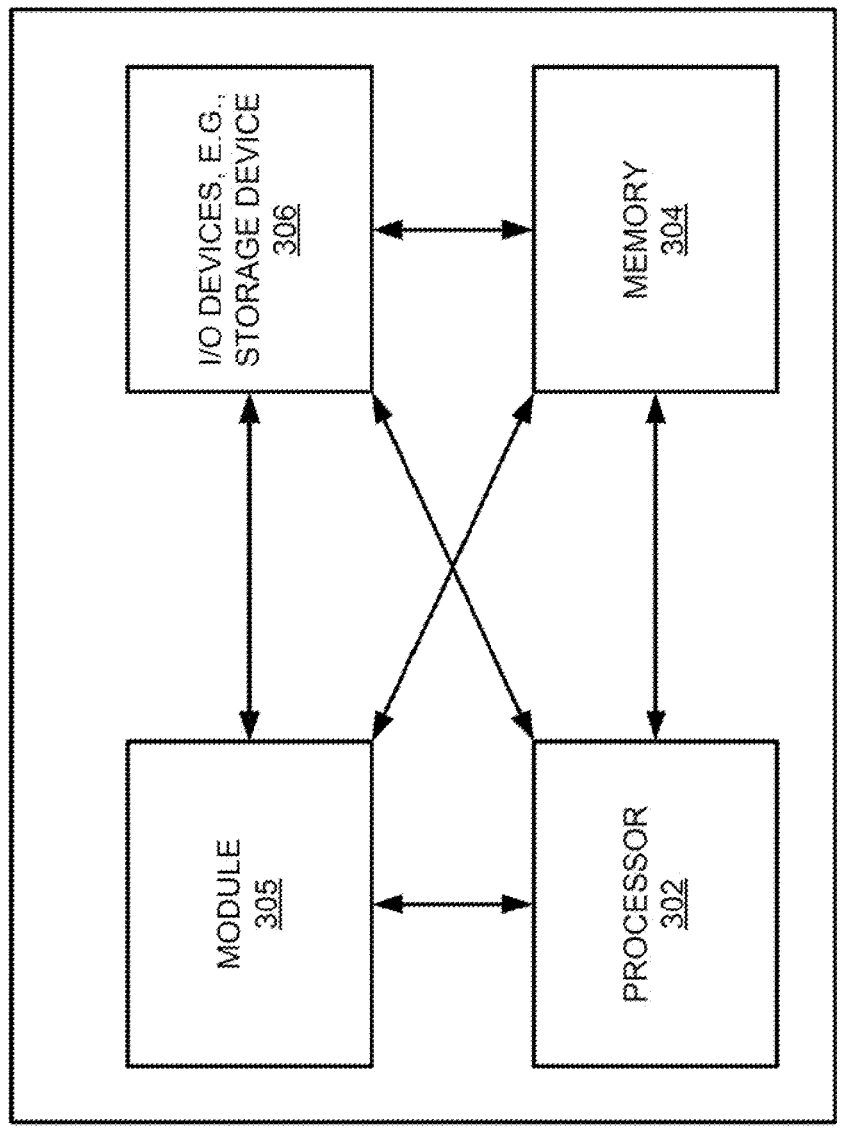
FIG. 3 illustrates an example of a computing device, or computing system, specifically programmed to perform the steps, functions, blocks, and/or operations described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure. Thus, these and other modifications are all contemplated within the scope of the present disclosure.

Figure 2:
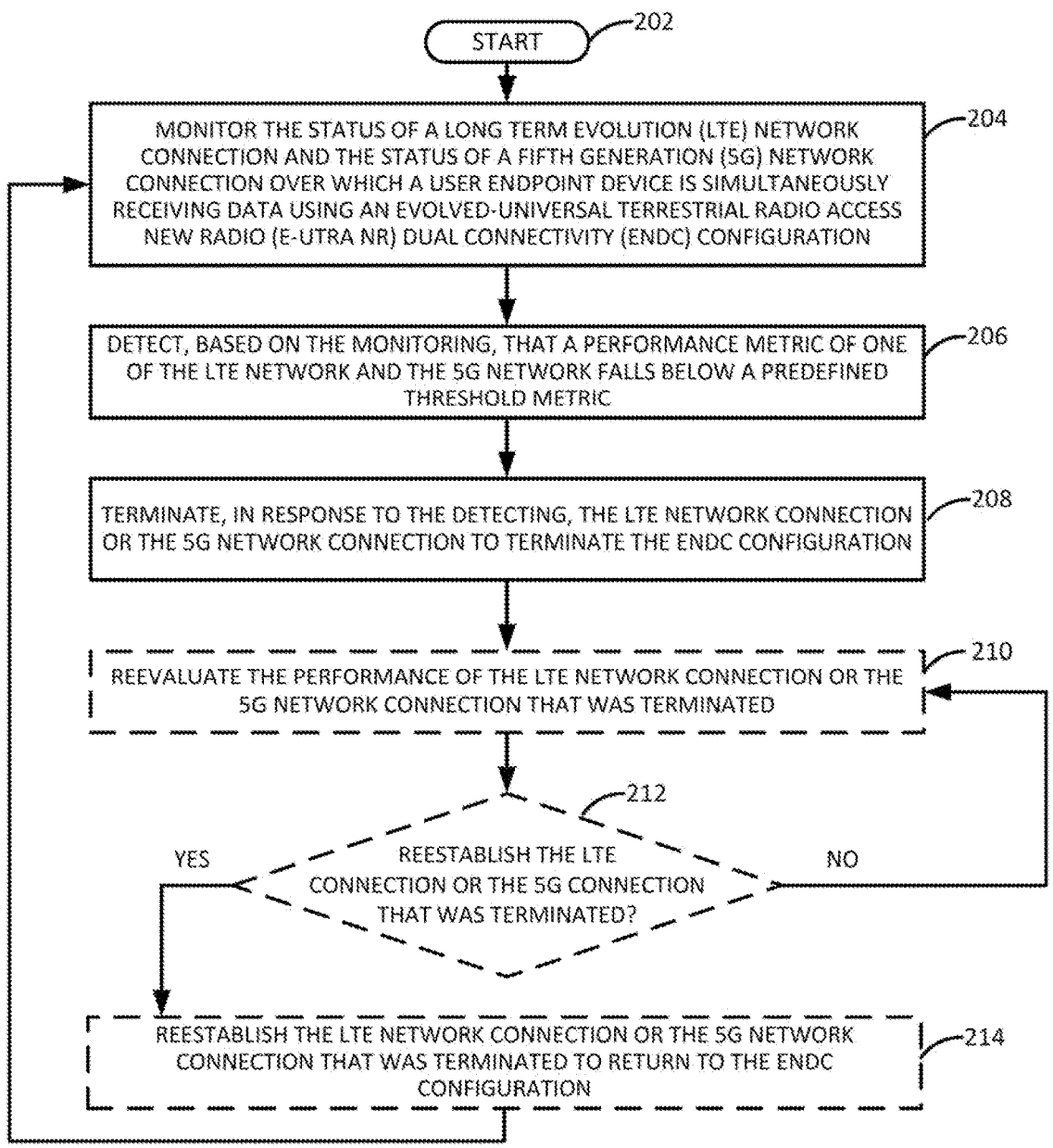
FIG. 2 illustrates a flowchart of an example method for selectively switching between networks while utilizing Evolved-Universal Terrestrial Radio Access New Radio Dual Connectivity, in accordance with the present disclosure.

FIG. 2 illustrates a flowchart of an example method for selectively switching between networks while utilizing Evolved-Universal Terrestrial Radio Access New Radio Dual Connectivity, in accordance with the present disclosure. In one example, steps, functions and/or operations of the method 200 may be performed by a device as illustrated in FIG. 1, e.g., user endpoint device 116. In one example, the steps, functions, or operations of method 200 may be performed by a computing device or system 300, and/or a processing system 302 as described in connection with FIG. 3 below. For instance, the computing device 300 may represent at least a portion of the user endpoint device 116 in accordance with the present disclosure. For illustrative purposes, the method 200 is described in greater detail below in connection with an example performed by a processing system, such as processing system 302.

The method 200 begins in step 202 and proceeds to step 204. In step 204, the processing system may monitor the status of a long term evolution (LTE) network connection and the status of a Fifth Generation (5G) network connection over which a user endpoint device is simultaneously receiving data using an Evolved-Universal Terrestrial Radio Access New Radio (E-UTRA NR) Dual Connectivity (ENDC) configuration. As discussed above, when a user endpoint device (such as a mobile phone, a tablet computer, a laptop computer, a wearable smart device, or the like) receives data from a source in a core network using ENDC, the data may be split so that a first portion of the data is delivered to the user endpoint device over an LTE network (e.g., via an eNodeb) and a second portion of the data is delivered to the user endpoint device over a 5G network (e.g., via a gNodeB). The first and second portions of the data may then be assembled at the user endpoint device to reconstruct the original data.

In one example, monitoring the status of the LTE network connection and the status of the 5G network connection may involve monitoring one or more network performance metrics than can be detected and measured at the user endpoint side. For instance, the processing system may be able to detect at least one of the following performance metrics for each of the LTE network connection and the 5G network connection: a number of packets discarded, a number of packet that were retransmitted, and a ratio of a number of transmission control protocol (TCP) acknowledgement (ACK) messages sent in the network to a number of TCP negative acknowledgement (NACK) messages send in the network, or a number of packets determined to be out of window.

During a TCP session, an ACK message is sent by a first device to a second device to confirm that the first device has received from the second device all of the data that the first device was expecting to receive in a given transmission. Conversely, a NACK message may indicate an error in the given transmission, where the error may include the receipt of data that the first device was not expecting to receive in the given transmission or a failure of the first device to receive at least a portion of the expected data. Thus, ACK and NACK messages inform a sending device of the receiving device's state, allowing the sending device to adjust its own state as necessary to achieve successfully data transmission.

An ACK message may also include a range of packet sequence numbers (beyond a sequence number of a last successfully received packet) that the receiving device will accept in a next transmission of data. This range of sequence numbers may comprise a number of octets, starting with an acknowledgement number. This range of sequence numbers defines a "window." If the sending device attempts to send a packet with a sequence number that does not fall within the acceptable range, the packet may be said to be "out of window" and may be rejected by the receiving device.

In further examples, other metrics of the performance of the LTE and 5G networks may also be monitored such as bandwidth, throughput, latency, traffic volume, and the like.

In step 206, the processing system may detect, based on the monitoring, that a performance metric of one of: the LTE network or the 5G network falls below a predefined threshold metric. In one example, the performance metric may comprise, for instance, at least one of: a maximum number of packets discarded (e.g., where the actual number of packets discarded by the user endpoint device and/or the sending device exceeds the maximum number of packets discarded), a maximum number of out of window packets (e.g., where the actual number of packets determined by the user endpoint device to be out of window exceeds the maximum number of out of window packets), a maximum number of re-transmitted packets (e.g., where the actual number of packets retransmitted by the sending device exceeds the maximum number of retransmitted packets), or a maximum ratio of a number of ACK messages sent in the network to a number of NACK messages sent in the network (e.g., where the actual ratio of the number of ACK messages to NACK messages sent by the user endpoint device is greater than the maximum ratio).

In other examples, the performance metric may be determined to fall below the predefined threshold metric when other measurable indicators are determined to be inadequate. For instance, the current volume of data traffic on the LTE network or the 5G network may be determined to exceed a maximum traffic volume, the available bandwidth to the user endpoint device over the LTE network or the 5G network may fall below a minimum bandwidth, the current throughput of the LTE network or the 5G network may fall below a minimum throughput, or the latency of the LTE network or the 5G network may exceed a maximum latency.

In one example, the performance metric may comprise any combination of the above-disclosed metrics. For instance, the performance of the LTE network or the network may be determined to be inadequate if at least two of the above-disclosed performance metrics cannot be satisfied. In another example, a cumulative performance metric that comprises a combination (e.g., a sum, an average, etc.) of the above-disclosed metrics may be calculated for each of the LTE network and the 5G network and compared to a predefined threshold metric. In this example, the different individual performance metrics disclosed above may be weighted if certain individual performance metrics are considered to be more indicative of poor performance than others (e.g., the number of dropped packets may be weighted more highly than the number of out of window packets).

It should be noted that the predefined threshold metric for the LTE network may not necessarily be the same as the predefined threshold metric for the 5G network. That is, the performance of the LTE network may be evaluated with respect to a first predefined threshold metric that is specific to the LTE network, while the performance of the 5G network may be evaluated with respect to a second predefined threshold metric that is specific to the 5G network (and is different from the first predefined threshold metric). Thus, the respective performances LTE network and the network may be evaluated based on different types of performance metrics and/or different threshold values for the types of performance metrics.

In step 208, the processing system may terminate, in response to the detecting, the LTE network connection or the 5G network connection to terminate the ENDC configuration. More specifically, the processing system may terminate the connection to the network for which the performance metric was detected to fall below the predefined threshold metric. Thus, if the performance metric for the LTE network was detected as falling below the predefined threshold performance metric in step 206, then in step 208, the processing system may terminate the user endpoint device's connection to the LTE network (while maintaining the user endpoint device's connection to the 5G network). Conversely, if the performance metric for the 5G network was detected as falling below the predefined threshold performance metric in step 206, then in step 208, the processing system may terminate the user endpoint device's connection to the 5G network (while maintaining the user endpoint device's connection to the LTE network).

In one example, if the connection to the 5G network is the network connection that is terminated in step 208, then the termination of the 5G network connection may be accomplished using existing ENDC secondary cell group (SCG) failure mechanisms (e.g., for address failure during new radio (NR) additions). For instance, in one example, the gNodeB may be dropped by the user endpoint device, and the bearer (e.g., the tunnel used to connect the user endpoint device to the PDN gateway) may be moved to an LTE-only configuration.

In optional step 210 (illustrated in phantom), the processing system reevaluate the performance of the LTE network connection or the 5G network connection that was terminated in step 208. For instance, in one example, the processing system may periodically monitor the performance of the LTE network connection or the 5G network connection that was terminated, and may reevaluate the performance against the predefined threshold performance metric to see if the performance has improved (e.g., to at least meet the predefined threshold performance metric). Since network performance may vary over time and may improve or decline in response to various different factors, the drop in performance below the predefined threshold performance metric may only be temporary. As such, it may be prudent to periodically reevaluate whether the user endpoint device can return to the ENDC configuration. In one example, the reevaluation may be performed after a threshold period of time (e.g., x minutes such as 1 minute, 2 minutes, etc.) has elapsed since the termination in step 208. The reevaluation may be repeated periodically (e.g., once every x seconds), randomly, according to a predefined schedule (e.g., during non-peak traffic periods), or in response to the detection of predefined events occurring (e.g., performance of the network connection that was not terminated in step 208 falling below the predefined threshold performance metric, handover of the user endpoint device to a new cell, etc.). In one example, a predefined limit may define a maximum number of times that the reevaluation may be performed. The maximum number of times may comprise an absolute number of times (e.g., stop after y tries) or a maximum number of times per window of time (e.g., no more than y times per every z minutes).

In optional step 212 (illustrated in phantom), the processing system may determine, in response to the reevaluating, whether to reestablish the LTE network connection or the 5G network connection that was terminated. In one example, the processing system may determine that the LTE network connection or the 5G network connection that was terminated should be reestablished if the performance of the network to which the connection was terminated now at least meets the predefined threshold metric. In another example, the processing system may determine that the LTE network connection or the 5G network connection that was terminated should be reestablished if the performance of the network to which the connection was terminated is now better than the performance of the network to which the connection was not terminated.

If the processing system determines in step 212 that the LTE network connection or the 5G network connection that was terminated should not be reconnected, then the method 200 may return to step 210 after a period of time (e.g., periodically, randomly, according to a predefined schedule, or in response to the detection of a predefined event occurring) and may again reevaluate the performance of the LTE network connection or the 5G network connection that was terminated.

If, however, the processing system determines in step 212 that the LTE network connection or the 5G network connection that was terminated should be reconnected, then the method 200 may proceed to optional step 214 (illustrated in phantom), and the processing system may reestablish the LTE network connection or the 5G network connection that was terminated to return to the ENDC configuration.

The method 200 may then return to step 204 and may continue to monitor the status of the LTE network connection and the status of the 5G network connection as discussed above, disconnecting either network connection when necessary. The method 200 may continue until the user endpoint device terminates both network connections, e.g., in response to the user of the user endpoint device pausing or terminating a data transfer, in response to the user powering off the user endpoint device or setting the user endpoint device to an idle or non-connected (e.g., airplane) mode, or the like.

The method 200 is therefore able to detect, on the user endpoint device side, when the performance of one of the networks being utilized in an ENDC configuration falls below a threshold performance metric. When performance below the threshold performance metric is detected, the user endpoint device may disconnect from the low performing network and continue any data transmissions over a single network (i.e., the network whose performance is above the threshold performance metric). This allows the user endpoint device to benefit from the advantages of EN DC for as long as the ENDC is providing an acceptable level of performance; however, if and when the performance of the ENDC configuration no longer meets that acceptable level, the user endpoint device may selectively disconnect from the network that is the source of the poor performance.

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the methods can be stored, displayed, and/or outputted either on the device executing the methods or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described methods can be combined, separated, and/or performed in a different order from that described above, without departing from the examples of the present disclosure.

FIG. 3 depicts a high-level block diagram of a computing device or processing system specifically programmed to perform the functions described herein. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for selectively switching between networks while utilizing Evolved-Universal Terrestrial Radio Access New Radio Dual Connectivity, in accordance with the present disclosure, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above are implemented in a distributed or parallel manner for a particular illustrative example, i.e., the steps of the above method 200 or the entire method 200 are implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for selectively switching between networks while utilizing Evolved-Universal Terrestrial Radio Access New Radio Dual Connectivity (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for selectively switching between networks while utilizing Evolved-Universal Terrestrial Radio Access New Radio Dual Connectivity (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   monitoring, by a processing system including at least one processor, a status of a long term evolution network connection and a status of a fifth generation network connection over which a user endpoint device is simultaneously receiving data using an evolved-universal terrestrial radio access new radio dual connectivity configuration;
   detecting, by the processing system based on the monitoring, that a performance metric of one of: the long term evolution network or the fifth generation network falls below a predefined threshold metric;
   terminating, by the processing system in response to the detecting, the long term evolution network connection or the fifth generation network connection to terminate the evolved-universal terrestrial radio access new radio dual connectivity configuration, wherein the terminating comprises terminating a connection to the one of: the long term evolution network or the fifth generation network for which the performance metric was determined to fall below the predefined threshold metric; and
   reevaluating, by the processing system subsequent to the terminating, a performance of the one of: the long term evolution network or the fifth generation network for which the performance metric was determined to fall below the predefined threshold metric, wherein the reevaluating is performed randomly subsequent to the terminating.

2. The method of claim 1, wherein the processing system is part of the user endpoint device.

3. The method of claim 1, wherein a first portion of the data is received by the user endpoint device over the long term evolution network connection, and a second portion of the data, different from the first portion of the data, is received by the user endpoint device over the fifth generation network connection.

4. The method of claim 3, wherein the first portion of the data and the second portion of the data are assembled at the user endpoint device to reconstruct the data.

5. The method of claim 1, wherein the performance metric comprises a number of data packets that have been discarded by the one of: the long term evolution network or the fifth generation network.

6. The method of claim 1, wherein the performance metric comprises a number of data packets that have been retransmitted by the one of: the long term evolution network or the fifth generation network.

7. The method of claim 1, wherein the performance metric comprises a number of data packets that have been determined to be out of window by the one of: the long term evolution network or the fifth generation network.

8. The method of claim 1, wherein the performance metric comprises a ratio of a number of transmission control protocol acknowledgment messages sent in the one of: the long term evolution network or the fifth generation network to a number of transmission control protocol negative acknowledgment messages sent in the one of: the long term evolution network or the fifth generation network.

9. The method of claim 1, wherein the performance metric comprises at least one of: a bandwidth of the one of: the long term evolution network or the fifth generation network, a throughput of the one of: the long term evolution network or the fifth generation network, a latency of the one of: the long term evolution network or the fifth generation network, or a traffic volume of the one of: the long term evolution network or the fifth generation network.

10. The method of claim 1, wherein the performance metric comprises a combination of at least two of: a number of data packets that have been discarded by the one of: the long term evolution network or the fifth generation network, a number of data packets that have been retransmitted by the one of: the long term evolution network or the fifth generation network, a number of data packets that have been determined to be out of window by the one of: the long term evolution network or the fifth generation network, or a ratio of a number of transmission control protocol acknowledgment messages sent in the one of: the long term evolution network or the fifth generation network to a number of transmission control protocol negative acknowledgment messages sent in the one of: the long term evolution network or the fifth generation network.

11. The method of claim 1, wherein the predefined threshold metric varies for the long term evolution network and the fifth generation network.

12. The method of claim 1, further comprising:
    determining, by the processing system in response to the reevaluating, that a connection to the one of: the long term evolution network or the fifth generation network for which the performance metric was determined to fall below the predefined threshold metric should be reestablished; and reestablishing, by the processing system in response to the determining, the long term evolution network connection or the fifth generation network connection that was terminated to return to the evolved-universal terrestrial radio access new radio dual connectivity configuration.

13. A non-transitory computer-readable medium storing instructions which, when executed by a processing system including at least one processor, cause the processing system to perform operations, the operations comprising:

monitoring a status of a long term evolution network connection and a status of a fifth generation network connection over which a user endpoint device is simultaneously receiving data using an evolved-universal terrestrial radio access new radio dual connectivity configuration;

detecting, based on the monitoring, that a performance metric of one of: the long term evolution network or the fifth generation network falls below a predefined threshold metric;

terminating, in response to the detecting, the long term evolution network connection or the fifth generation network connection to terminate the evolved-universal terrestrial radio access new radio dual connectivity configuration, wherein the terminating comprises terminating a connection to the one of: the long term evolution network or the fifth generation network for which the performance metric was determined to fall below the predefined threshold metric; and reevaluating, subsequent to the terminating, a performance of the one of: the long term evolution network or the fifth generation network for which the performance metric was determined to fall below the predefined threshold metric, wherein the reevaluating is performed randomly subsequent to the terminating.

14. The non-transitory computer-readable medium of claim 13, wherein the performance metric comprises a combination of at least two of: a number of data packets that have been discarded by the one of: the long term evolution network or the fifth generation network, a number of data packets that have been retransmitted by the one of: the long term evolution network or the fifth generation network, a number of data packets that have been determined to be out of window by the one of: the long term evolution network or the fifth generation network, or a ratio of a number of transmission control protocol acknowledgment messages sent in the one of: the long term evolution network or the fifth generation network to a number of transmission control protocol negative acknowledgment messages sent in the one of: the long term evolution network or the fifth generation network.

15. The non-transitory computer-readable medium of claim 13, wherein the predefined threshold metric varies for the long term evolution network and the fifth generation network.

16. The non-transitory computer-readable medium of claim 13, wherein the operations further comprise:

determining, in response to the reevaluating, that a connection to the one of: the long term evolution network or the fifth generation network for which the performance metric was determined to fall below the predefined threshold metric should be reestablished; and reestablishing, in response to the determining, the long term evolution network connection or the fifth generation network connection that was terminated to return to the evolved-universal terrestrial radio access new radio dual connectivity configuration.

17. A device comprising:

a processing system including at least one processor; and a non-transitory computer-readable medium storing instructions which, when executed by the processing system, cause the processing system to perform operations, the operations comprising:

monitoring a status of a long term evolution network connection and a status of a fifth generation network connection over which a user endpoint device is simultaneously receiving data using an evolved-universal terrestrial radio access new radio dual connectivity configuration;

detecting, based on the monitoring, that a performance metric of one of: the long term evolution network or the fifth generation network falls below a predefined threshold metric;

terminating, in response to the detecting, the long term evolution network connection or the fifth generation network connection to terminate the evolved-universal terrestrial radio access new radio dual connectivity configuration, wherein the terminating comprises terminating a connection to the one of: the long term evolution network or the fifth generation network for which the performance metric was determined to fall below the predefined threshold metric; and reevaluating, subsequent to the terminating, a performance of the one of: the long term evolution network or the fifth generation network for which the performance metric was determined to fall below the predefined threshold metric, wherein the reevaluating is performed randomly subsequent to the terminating.

18. The device of claim 17, wherein the performance metric comprises a combination of at least two of: a number of data packets that have been discarded by the one of: the long term evolution network or the fifth generation network, a number of data packets that have been retransmitted by the one of: the long term evolution network or the fifth generation network, a number of data packets that have been determined to be out of window by the one of: the long term evolution network or the fifth generation network, or a ratio of a number of transmission control protocol acknowledgment messages sent in the one of: the long term evolution network or the fifth generation network to a number of transmission control protocol negative acknowledgment messages sent in the one of: the long term evolution network or the fifth generation network.

19. The device of claim 17, wherein the predefined threshold metric varies for the long term evolution network and the fifth generation network.

20. The device of claim 17, wherein the operations further comprise:

determining, in response to the reevaluating, that a connection to the one of: the long term evolution network or the fifth generation network for which the performance metric was determined to fall below the predefined threshold metric should be reestablished; and reestablishing, in response to the determining, the long term evolution network connection or the fifth generation network connection that was terminated to return to the evolved-universal terrestrial radio access new radio dual connectivity configuration.

* * * * *